M. PHILIPP.
RESILIENT WHEEL.
APPLICATION FILED SEPT. 6, 1918.
1,307,212. Patented June 17, 1919.
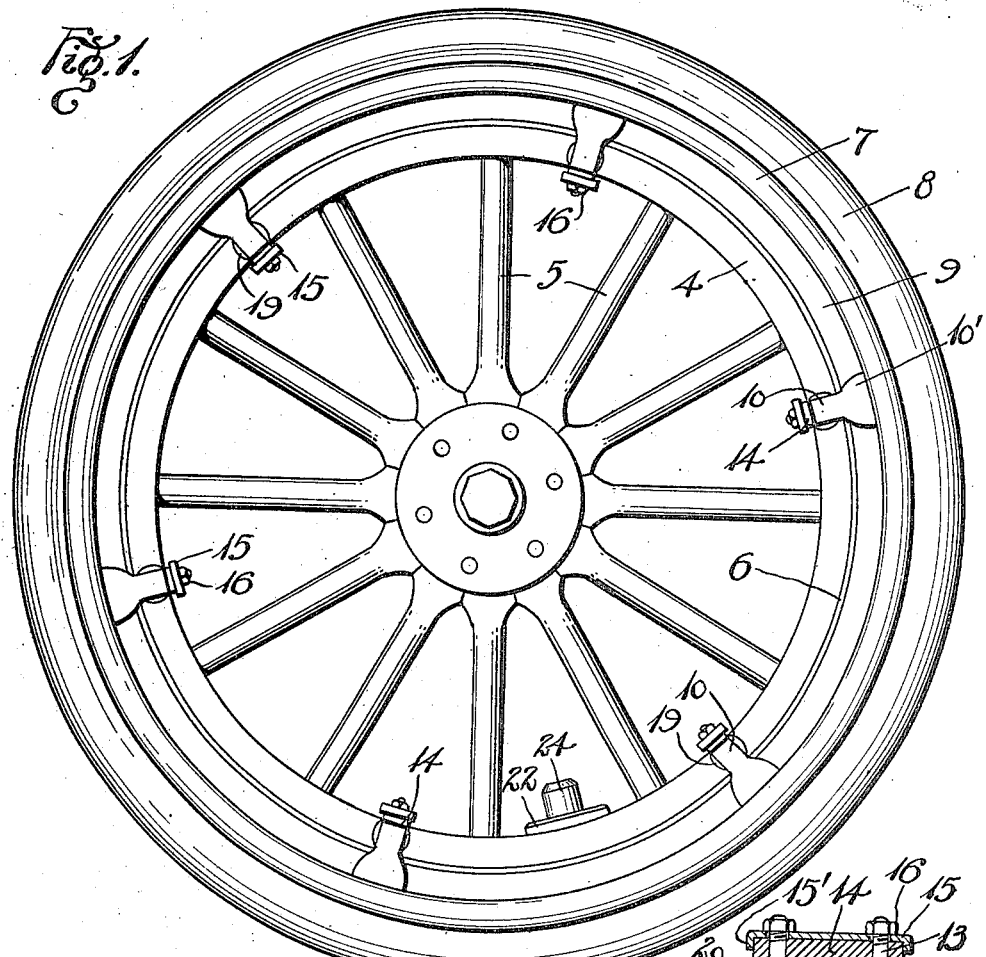
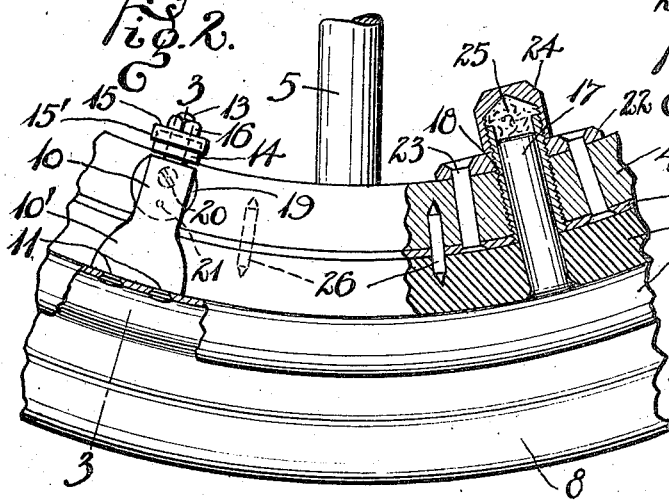
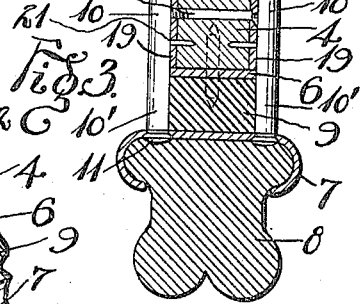
Inventor,
Michael Philipp,
by Monroe E. Miller
Attorney.

UNITED STATES PATENT OFFICE.

MIACHEL PHILIPP, OF WAUSAU, WISCONSIN, ASSIGNOR TO NATIONAL AUTO WHEELS CORPORATION, OF WAUSAU, WISCONSIN, A CORPORATION OF WISCONSIN.

RESILIENT WHEEL.

1,307,212.      Specification of Letters Patent.      Patented June 17, 1919.

Application filed September 6, 1918. Serial No. 252,848.

*To all whom it may concern:*

Be it known that I, MIACHEL PHILIPP, a citizen of the United States, and resident of Wausau, in the county of Marathon and State of Wisconsin, have invented certain new and useful Improvements in Resilient Wheels, of which the following is a specification.

The present invention relates to that type of resilient vehicle wheel which is provided with cushioning means between the rim and felly, and is particularly an improvement over the cushioned wheel disclosed in the patent granted to Albert L. Bennett on April 9, 1918, No. 1,261,896.

The invention has for its general object to improve and simplify the construction of wheels of this class, so as to be thoroughly reliable and efficient in use, comparatively simple and inexpensive to manufacture and keep in operative condition, and so designed as to obtain the advantages of a perfect resilient wheel, and at the same time, eliminating the inherent disadvantages of the pneumatic type manifested in the perpetual care and expense for upkeep.

A further object of the invention is to improve the assemblage and relation of parts to obtain the desired results in the most satisfactory manner without complications in construction and manufacture.

With the foregoing and other objects in view, which will be apparent as the invention is more fully understood, the invention resides in the construction and arrangement of parts as hereinafter described and claimed, it being understood that changes can be made within the scope of what is claimed without departing from the spirit of the invention.

The invention is illustrated in the accompanying drawing, wherein—

Figure 1 is a side elevation of the improved wheel.

Fig. 2 is a fragmentary elevation thereof, portions being shown in section.

Fig. 3 is a sectional view taken on the line 3—3 of Fig. 2.

The body of the wheel may be of any suitable type, and as shown is of the artillery style, having the wooden felly 4 and spokes 5, with a metallic band 6 fitted on and embracing the felly to hold the parts intact. Surrounding and spaced from the felly and band, is a rim 7 for the tire 8, said rim being shown as of the clencher type for retaining the solid rubber or similar tire (a pneumatic tire being unnecessary). Disposed between the band 6 and rim 7 is an annular resilient cushion 9 made of suitable material, such as pliable rubber of such composition as to give just the desired amount of resiliency.

In order to maintain the felly and rim in a common plane and still permit them to have a relative motion in said plane, there are provided a suitable number of pairs of guide plates 10 disposed radially at suitably spaced points along the periphery of the felly. The outer ends of said plates 10 are increased in width, as at 10', and are curved to snugly fit the inner periphery of the rim 7. Said curved and widened outer ends of the guide plates are each provided with two or more studs 11 projecting outwardly through apertures in the rim and riveted securely thereto, whereby the plates are braced firmly. The widened outer ends of the plates extend longitudinally of the rim as well as the securing means 11, to obtain the bracing effect, and the cushion 9 is disposed between the positions 10' of the plates, with the plates projecting and tapering inwardly and having their inner end portions overlapping the opposite sides of the felly. Thus, the felly is movable snugly between the guide plates in the median plane of the wheel, and said plates prevent relative side motion of the rim and felly.

At their inner ends the guide plates are provided with reduced portions or stems 13 projecting inwardly beyond the inner periphery of the felly, and between each pair of plates a rubber or similar pad or supplementary cushion 14 extends transversely across the inner periphery of the felly to bear thereagainst and the pad or cushion has apertures through which the stems 13 extend. For each pad or cushion 13 there is a yoke or cross piece 15 having apertures near its ends loosely receiving the stems, so that the pads or cushions 13 are confined between the inner periphery of the felly and the yokes 15, said yokes being retained on the stems by means of nuts 16 threaded on the stems. The margins of the yokes are provided with outturned flanges 15' overlapping the margins of the pads or cushions 13 so as to provide cups for partially receiving the pads for preventing spreading thereof. Thus, as the cushion permits the felly and wheel body to have a floating or resilient action within the rim, the pads or cushions 14 in being pressed against the felly from the inside will serve to take up the rebound and also assist in the cushioning of the wheel and the absorption of shocks, without danger of the parts of the wheel getting out of median plane alinement. The yokes 15 serve to hold the guide plates against separation as well as retaining the pads 13 for compression when the felly is forced against them.

In order to decrease the friction and wear of the contacting surfaces between the felly and guide plates, flat circular metal disks 19 are embedded in the sides of the felly behind the plates and said plates contact slidably with the disks without wearing the wood of the felly, and also with less friction than when said plates contact with the felly. These disks 19 are clamped in pairs against the felly by bolts 20 connecting them and extending through the felly, and pins or dowels 21 serve to assist in holding said disks firm. The disks take up the wear caused by the side thrust between the rim and felly and the guide plates can always slide freely across the faces of the disks.

The transmission of traction force between the felly and rim is effected by one or more plain or smooth cylindrical studs 17, only one being necessary usually. The outer end of the radial stud 17 is welded or otherwise securely attached to the inner periphery of the rim 7, and is of sufficient length to project through the felly, which has a hole bored radially therethough for the purpose. In this hole a radial sleeve 18 is inserted, and same is externally screw-threaded from end to end, with the outer end threaded into the bank 6, and the stud or pin 17 is slidable freely in the guide sleeve as the felly and rim move with respect to one another, but will at all times transmit the force and prevent relative circumferential movement of the rim and felly. A plate 22 is threaded onto the inner projecting terminal of the sleeve and bears against the inner periphery of the felly to fasten the sleeve firmly to the felly, and rivets 23 extending through the felly connect the band 6 and plate 22 to clamp said plate in place. A cap 24 is screwed on the inner end of the sleeve to inclose same and the inner end of the stud 17, so as to keep out dirt and foreign matter, and to also inclose a lubricating filler 25, such as flake graphite. The cap thus serves as a pocket or receptacle for the lubricant into which the stud dips, to lubricate the contacting surfaces between the stud and sleeve, which owing to the transmission of traction force is quite great, and if the parts were not continually lubricated, friction might cause excessive wear.

A longitudinal series of spurs 26 are driven into the felly from the outside, and project through the band 6 outwardly into the main cushion 9, but the outer ends of said spurs are spaced sufficiently from the rim to prevent interference. These spurs are spaced several inches apart completely around the felly and in being fixed thereto with the cushion 9 fitted over said spurs, will eliminate all longitudinal and side shifting of the cushion throughout its length with respect to the felly and rim. These spurs or equivalent means are therefore of assistance in retaining the cushion 9 in proper operative position.

Having thus described the invention, what is claimed is:

1. A vehicle wheel having a felly, a rim surrounding it, cushioning means between them, a band fitted on the felly, a plate fitting the inner periphery of the felly, securing means connecting said plate and band through the felly, a sleeve extending through the felly and threadedly engaging said band and plate, and a stud secured to the rim and slidable within the sleeve to transmit traction force.

2. A vehicle wheel having a felly, a rim surrounding it, an inwardly extending stud secured to the rim, the felly having a hole therethrough receiving said stud, a rubber cushion between said felly and rim around said stud and closing the outer end of said hole, and removable means at the inner end of said hole for closing it and permitting lubrication of said stud.

In testimony whereof I hereunto set my hand this 20th day of August, 1918.

MIACHEL PHILIPP.